US012662207B2

(12) United States Patent
King et al.

(10) Patent No.: US 12,662,207 B2
(45) Date of Patent: Jun. 23, 2026

(54) SELF HITCHING AND PARKING TRAILERS, AND SYSTEMS AND METHODS FOR TRAILERS

(71) Applicant: STREAM IT, INC., Austin, TX (US)

(72) Inventors: Lance M. King, Austin, TX (US); Zach Radkey-Pechacek, Austin, TX (US); Nathan Swanson, Austin, TX (US); Timothy Wulff, Austin, TX (US)

(73) Assignee: STREAM IT, INC., Austin, TX (US)

( * ) Notice: Subject to any disclaimer, the term of this patent is extended or adjusted under 35 U.S.C. 154(b) by 336 days.

(21) Appl. No.: 18/137,974

(22) Filed: Apr. 21, 2023

(65) Prior Publication Data

US 2023/0339558 A1     Oct. 26, 2023

Related U.S. Application Data

(60) Provisional application No. 63/334,031, filed on Apr. 22, 2022, provisional application No. 63/334,026, filed on Apr. 22, 2022.

(51) Int. Cl.
*B62D 59/04*          (2006.01)
*G05D 1/00*          (2024.01)
(52) U.S. Cl.
CPC ........... *B62D 59/04* (2013.01); *G05D 1/0088* (2013.01)
(58) Field of Classification Search
None
See application file for complete search history.

(56) References Cited

U.S. PATENT DOCUMENTS

| | | | |
|---|---|---|---|
| 9,840,277 B1 * | 12/2017 | Beech | B60D 1/62 |
| 10,894,534 B2 | 1/2021 | Hiller et al. | |
| 11,203,337 B2 | 12/2021 | Karlsson et al. | |
| 11,607,918 B2 | 3/2023 | Goodarzi et al. | |
| 2019/0210479 A1 * | 7/2019 | Bachmann | B60L 15/38 |
| 2019/0302764 A1 * | 10/2019 | Smith | G05D 1/0276 |
| 2021/0053407 A1 * | 2/2021 | Smith | B25J 19/021 |
| 2022/0371199 A1 * | 11/2022 | Schultz | B25J 9/1697 |
| 2023/0236593 A1 * | 7/2023 | Overfield | B62D 59/04 |
| | | | 701/2 |
| 2023/0328490 A1 | 10/2023 | Brinkman et al. | |
| 2023/0331050 A1 * | 10/2023 | Yang | B60D 1/36 |
| 2024/0116584 A1 * | 4/2024 | Anduray | B62D 53/125 |

OTHER PUBLICATIONS

Lopez, J., GM Files Patent for Tow Assist System, GM Authority, Mar. 25, 2023, 4 pgs., [online] URL: https://gmauthority.com/blog/2023/03/gm-files-patent-for-tow-assist-system/.

* cited by examiner

*Primary Examiner* — Amelia Vorce
(74) *Attorney, Agent, or Firm* — Buchalter LLP

(57)          ABSTRACT

Self-hitching and parking trailers, and systems, methods, and non-transitory computer-readable media for controlling a trailer are provided herein. A system for controlling a trailer can comprise one or more sensors configured to detect sensor data associated with a trailer, a tow vehicle, and/or an area surrounding the trailer, and a controlling having one or more processors, and a memory storing software instructions that, when executed by the processor(s), cause the processor(s) to obtain sensor data, obtain an indication of an event based at least in part on the sensor data, and initiate a trailer action.

17 Claims, 4 Drawing Sheets

SELF HITCHING AND PARKING TRAILERS, AND SYSTEMS AND METHODS FOR TRAILERS

CROSS-REFERENCE TO RELATED APPLICATIONS

This application claims priority to U.S. Provisional Application Nos. 63/334,026, filed on Apr. 22, 2022, and 63/334,031, filed on Apr. 22, 2022. These and all other extrinsic materials discussed herein, including publications, patent applications, and patents, are incorporated by reference in their entirety. Where a definition or use of a term in an incorporated reference is inconsistent or contrary to the definition of that term provided herein, the definition of that term provided herein applies and the definition of the term in the reference does not apply.

FIELD OF THE INVENTION

The field of the invention is trailers, and systems and methods for controlling trailers.

BACKGROUND

Hitching and unhitching trailers can be strenuous, time consuming, error prone, and risky and as we transition to electric vehicles there is the potential to need to hitch and unhitch trailers much more frequently so that the tow vehicle can fit into a charging stall to recharge (and recharging happens more frequently because of the reduced range when towing a trailer). This can become even less convenient during times of inclement weather.

SUMMARY

Accordingly, self-hitching and parking trailers, and systems, methods, and non-transitory computer-readable media for controlling a trailer are provided herein.

According to one aspect, a system for controlling a trailer is provided, comprising one or more sensors configured to detect data associated with at least one of the trailer, a tow vehicle the trailer is configured to mechanically couple to, and an area surrounding at least one of the trailer and the tow vehicle, and a controller, comprising one or more processors, and a memory storing software instructions that, when executed by the one or more processors, cause the one or more processors to: obtain the sensor data from the one or more sensors; obtain an indication of an event based at least in part on the sensor data; and initiate a mechanical coupling or decoupling of the trailer to the tow vehicle based at least in part on obtaining the indication of the event.

According to another aspect, a trailer configured to mechanically couple to a tow vehicle is provided, comprising a powering system, a steering system, a hitching system, and a controller operably coupled to the powering system, the steering system and the hitching system for at least one of unhitching, hitching and parking the trailer. In some embodiments, the trailer does not comprise a driver and/or passenger seat and is configured to be driven by a user that is not in/on the trailer.

In another aspect, a trailer configured to couple to a tow vehicle having a hitch with at least a first opening (e.g., first and second openings) is provided, comprising a coupling device, the coupling device comprising: a first portion coupled to (or configured to couple to) the trailer, a second portion coupled to the first portion via a first joint, a third portion coupled to the second portion via a second joint, the third portion having an end portion sized and dimensioned to be received by the hitch of the tow vehicle. In some embodiments, the end portion comprises first and second pins configured to extend through the first and second openings to secure the coupling device to the tow truck. In some embodiments, the first and second joints each provide pitch, and only the second joint provides roll. In some embodiments, each of the first, second, and third portions are straight/linear. In some embodiments, the first and/or second joints are universal joints. In some embodiments, the first, second and third portions each comprise a single piece. In some embodiments, the coupling devices can comprise any suitable number of portions (e.g., 2, 3, 4, 5) and/or joints (e.g., 1, 2, 3, 4, 5). In some embodiments, each of the portions can comprise a single piece (e.g., other than retractable pins). It should be appreciated that when two physical components are described herein as being "coupled to" one another, such term is intended to include both direct coupling (in which two elements that are coupled to each other contact each other) and indirect coupling (in which at least one additional element is between the two elements) unless the context dictates otherwise.

In another aspect, a system for controlling a trailer is provided, comprising one or more sensors configured to detect data associated with at least one of the trailer, a tow vehicle the trailer is configured to mechanically couple to, and an area surrounding at least one of the trailer and the tow vehicle (e.g., roads, ground the tires are on/navigating, lots, area immediately surrounding the vehicle), and a controller, comprising: one or more processors; and a memory storing software instructions that, when executed by the one or more processors, cause the one or more processors to: obtain the sensor data from the one or more sensors, identify an event associated with at least one of the trailer, the tow vehicle and the area surrounding at least one of the trailer and the tow vehicle based at least in part on the sensor data, and initiate an action related to at least one component of the trailer based at least in part on identifying the event.

In another aspect, a non-transitory computer readable medium having instructions stored therein is provided, wherein the instructions, when executed by a processor, cause the processor to: obtain the sensor data from one or more sensors coupled to at least one of a tow vehicle and a trailer configured to couple to the tow vehicle, obtain an indication of an event associated with at least one of the trailer, the tow vehicle and the area surrounding at least one of the trailer and the tow vehicle based at least in part on the sensor data, and initiate an action related to at least one component of the trailer based at least in part on identifying the event.

In another aspect, a method is provided, comprising using at least one hardware processor to obtain sensor data from one or more sensors coupled to at least one of a tow vehicle and a trailer configured to couple to the tow vehicle, obtain an indication of an event associated with at least one of the trailer, the tow vehicle and the area surrounding at least one of the trailer and the tow vehicle based at least in part on the sensor data, and initiate an action related to at least one component of the trailer based at least in part on identifying the event.

Other advantages and benefits of the disclosed system and methods will be apparent to one of ordinary skill with a review of the following detailed description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

In an embodiment, systems, methods, and non-transitory computer-readable media are disclosed for controlling a trailer, for example, for parking a trailer, steering a trailer, and hitching or unhitching a trailer to a tow vehicle. Sensors and AI/ML algorithms can be used to obtain an indication of an event, and optionally to initiate an action associated with the trailer.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims. In some instances, well-known structures and components are shown in simplified form for brevity of description. Some of the surfaces have been left out or exaggerated for clarity and ease of explanation.

System Overview

1.1. Infrastructure

Figure 1:
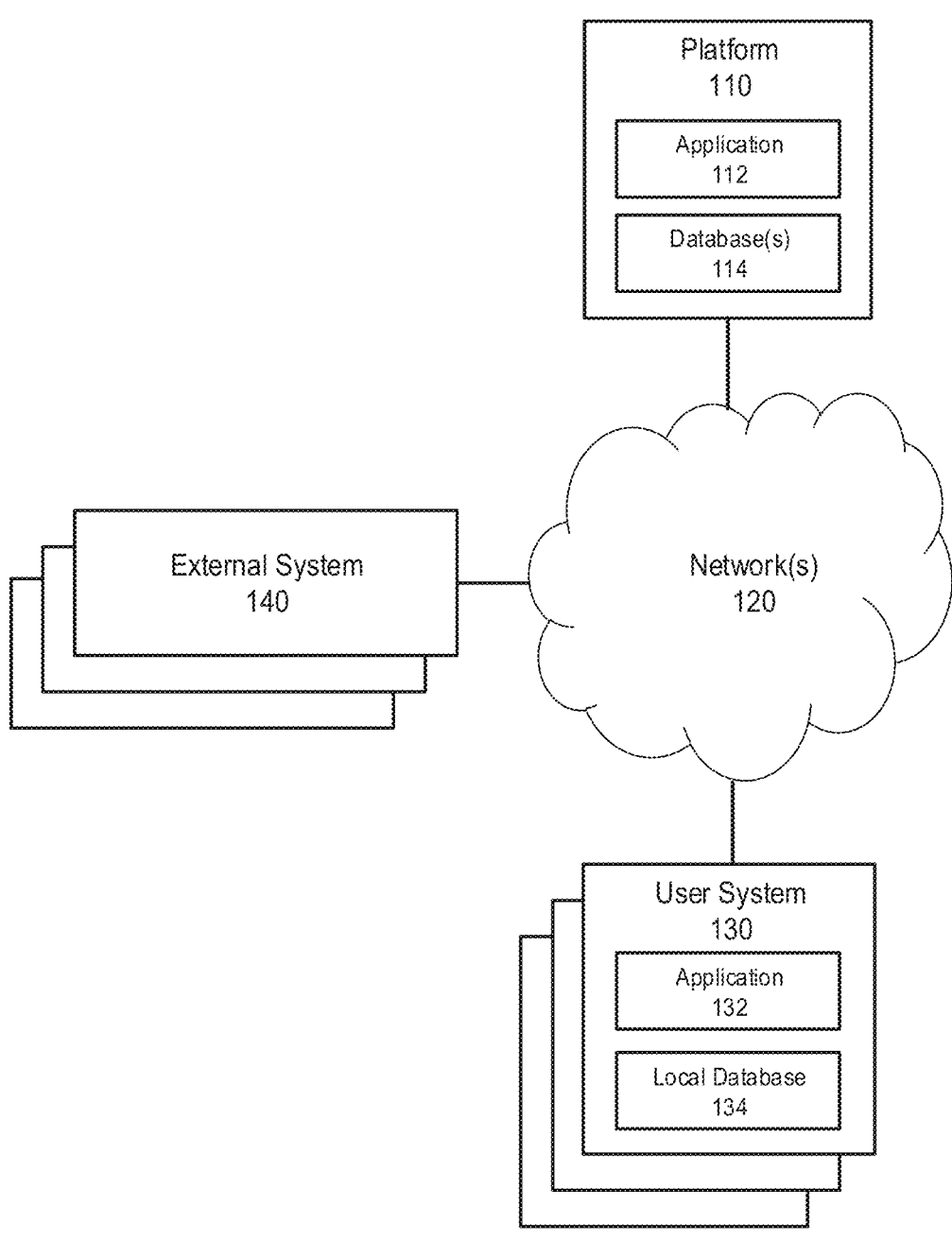
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120, or may be entirely implemented on the loopback (e.g., localhost) interface. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s)

120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases. In addition, communication between any of these systems, for example, platform 110, user systems 130, and/or external system 140, may be entirely implemented on the loopback (e.g., localhost) interface.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134. While user system 130 and platform 110 are shown here as separate devices connected by a network 120, user system 130 may comprise an application 132 that may comprise one portion of a distributed cloud-based system that integrates with platform 110, for example, using a multi-tasking OS (e.g., Linux) and local only (localhost) network addresses.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, or may be entirely implemented on the loopback (e.g., localhost) interface, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, MongoDB™, and the like, including cloud-based databases and proprietary databases. Data may be sent to platform 110, for instance, using the well-known POST, GET, and PUT request supported by HTTP, via FTP, proprietary protocols, requests using data encryption via SSL (HTTPS requests), and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

While platform 110, user systems 130, and external systems 140 are shown as separate devices communicatively coupled by network 120, each of the devices shown as platform 110, user systems 130, and external systems 140 may be implemented on one or more devices, and/or one or more of platform 110, user systems 130, and external systems 140 may be implemented on a single device.

1.2. Example Processing Device

Figure 2:
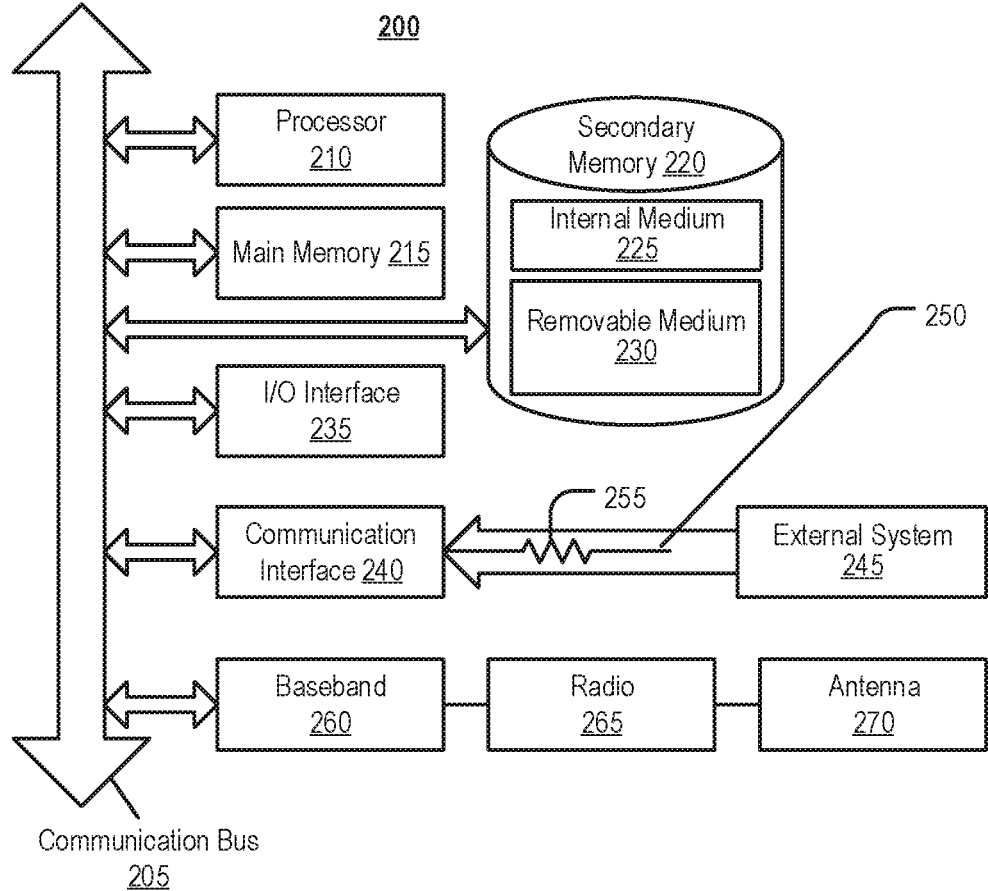
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N. V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

System 200 may comprise an I/O interface 235. In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components may comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

1. Process Overview

Embodiments of processes for controlling components of a trailer will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Trailers (e.g., nonautomotive vehicle, transport container, vehicle designed to serve as a temporary dwelling or place of business that are configured to be towed by a vehicle) are generally manually hitched to and unhitched from a tow vehicle, and rely on the tow vehicle to move—generally in the same direction as the tow vehicle. Further, known trailers are connected to a tow vehicle via wires to control certain components of the trailer (e.g., brake lights, turn signals, brakes).

The trailers, systems, methods and non-transitory computer readable media described herein can advantageously eliminate or reduce the need for a physical connection (e.g., other than to physically hitch the trailer to the tow vehicle), and can instead use sensors and artificial intelligence to determine when to use brake lights, turn signals, brakes, and other components of the trailer. A controller can be provided and operably coupled to the components to control the trailer (e.g., to turn a signal on and off, apply and release brakes). In some aspects, artificial intelligence, deep learning and machine learning technology can be utilized to ensure appropriate actions are taken (e.g., brake lights used, turn signal on/off, steer, speed up, slow down) and to continuously improve the trailers and systems described herein. For example, it is contemplated that a platform can obtain data from multiple sensors, user systems and external systems, and machine learning can be used to study the data, recognize patterns and correlations, and continuously improve the trailers and systems.

To build a reliable machine learning model, datasets can be divided into a training dataset and validation dataset. Training data is the set of data that is used to train and make the model learn features/patterns in the data. Training data can build up the machine learning algorithm. The algorithm can be fed input data, which corresponds to an expected output. The model can evaluate the data repeatedly to learn more about the data's behavior and adjusts to serve its intended purpose. The training data can be fed to the neural network repeatedly, and the model can continue to learn the features of the data. The validation set can comprise a set of data, separate from the training set, that is used to validate the model performance during training. The validation process can give information that helps determine whether the training is moving in the right direction or not (how well the model makes predictions). The model can be trained on the training set, and simultaneously, the model evaluation can be performed on the validation set.

In an aspect of the disclosure, the systems, methods and non-transitory computer readable media described herein can be used to cause a trailer to accelerate, for example, if the trailer has its own propulsion system. The propulsion system can comprise any suitable components to provide powered motion for the trailer (e.g., one or more transmissions, one or more sets of wheels (e.g., 1, 2, or more wheels), one or more engines, one or more motors, and/or one or more energy sources to power the engine or motor (e.g., fuel, batteries, electric power sources, solar panels, and/or any other suitable energy sources). In some aspects, the systems, methods and non-transitory computer readable media described herein can be used to control the steering of the trailer, for example, if the trailer has steerable wheels and/or a steering system. In some aspects, a system of the disclosure can be used to activate regenerative braking if that feature is incorporated into the trailer. In some aspects, the systems, methods and non-transitory computer readable media described herein can utilize wireless communication between the tow vehicle and the trailer to share information.

The trailers described herein can advantageously have their own means of propulsion and steering, and can comprise sensors and artificial intelligence combined with a user interface that enables a person to direct the trailer to, for example, unhitch itself from the tow vehicle, proceed to a designated parking space, proceed to a location of the tow vehicle, and hitch itself to the tow vehicle.

Such a trailer can make charging an electric vehicle easier as a person can remotely detach the trailer and have it park itself while they proceed to a separate parking space to change the vehicle (since most vehicle chargers are not designed to accommodate a trailer). Such a trailer can also make filling up a gas tank easier, and can be a useful feature when parking a trailer (e.g., at home for storage, at an RV park, or an RV storage lot).

Further, it is contemplated that the vehicle could change lanes as if the driver were driving a sports car with no (or substantially reduced) fishtailing and no (or significantly reduced) chance of jack-knifing. Still further, steerable trailer wheels could make it simple to parallel park or make a U turn or back out of a tight spot that normally wouldn't allow for that. Viewed from another perspective, the steerable trailer wheels could allow a person with no experience towing a trailer to tow like a professional, and make it possible for the trailer to maneuver (e.g., to park and/or navigate towards a tow vehicle) on its own when not connected to a vehicle. For example, is a user wants to charge an electric pickup but the cable cannot reach with the trailer attached, the trailer could be instructed to detach and find a parking place so the pickup can be charged.

The systems, methods, and non-transitory computer readable media described herein can advantageously allow a trailer to unhitch itself and find a parking space when it reaches its destination and/or when the tow vehicle needs to stop for a charge, and then autonomously hitch itself to the correct tow vehicle when requested. This can be done, for example, by utilizing AI (artificial intelligence); various sensors including optical, force, accelerometers, GPS (global positioning system), radar, lidar, and/or ultrasonic. The AI processor, for example, could comprise an NVIDIA Jetson robotics computer. The sensors can be used to determine where the trailer is, where the tow vehicle is, where open parking or charging spaces are, etc. The AI and sensors can be used to adjust the height, approach angle, alignment, and otherwise guide the trailer into the hitch on the tow vehicle. These same sensors can be used in combination with, or in place of, sensors or radios such as Bluetooth for tracking. For example, Bluetooth and ultrasonic sensors are both engineered to provide very accurate distance and position measurements. In some embodiments, the trailer could use optical sensors (cameras) positioned on each of the sides of the trailer and potentially on the tongue of the trailer to surveil its surroundings. An AI model could then use one or more neural networks to understand the environment, identify potential parking or charging spaces, identifying the tow vehicle (including through license plate recognition or other identifiers). Using the sensors and compute capability described herein can eliminate the need for a traditional 4 pin or 7 pin trailer wiring harness to connect the park/brake/signal lights and for braking so the driver of the tow vehicle would no longer need to exit the vehicle to disconnect or connect the wiring connections in order to unhitch or hitch a trailer respectively.

The trailer lights, brakes, and steering (by steerable wheels and/or by torque vectoring of drive wheels that are not steerable) can all be controlled without wired connections using a computing device (e.g. controller)/AI processor onboard the trailer. The commands to the trailer to hitch or unhitch can be given from an application on a computing device (e.g., a mobile device, vehicle infotainment system), through a dedicated wireless switch such as a Bluetooth button, and/or even potentially through gestures such as hand signals that are viewed by the trailer's sensors (e.g., image sensors, motion detectors), and/or voice controls that are provided to the trailer via integrated microphones or relayed from a mobile device or the tow vehicle's microphones. In some embodiments, autonomous movement could be safeguarded by requiring a user to hold down, for example, a virtual button on a mobile device or a physical button on a Bluetooth device, and/or though voice control/verbal cue that could be as simple as saying "STOP!" and/or automatically stopping for loud noises (e.g., when a honk is detected via one or more sensors), or through integration with the tow vehicle's infotainment system. Additionally or alternatively, the operator can simply direct the trailer using remote controls or by dragging and dropping an outline or other representation of the trailer onto the map (e.g., via the vehicle infotainment system) where the operator wants the trailer to go (such as into a parking space).

In some aspects, a trailer having a steering system including steerable wheels is provided, which can be controlled by a controller. In some embodiments, the trailer can have multiple (e.g., 4) independently-actuated wheels. In some aspects, steerable trailer wheels are provided, wherein the wheels can be configured to be steered and act like another set of wheels that rotate in relation to the vehicle. It is contemplated that the steerable wheels can make towing a trailer much safer, making it virtually impossible for the trailer to rollover. All suitable trailers are contemplated herein, including those described in Applicant's U.S. patent application Ser. No. 18/137,821 filed on Apr. 21, 2023, which is incorporated herein in its entirety.

According to one aspect, a system for controlling a trailer is provided, comprising one or more sensors configured to detect data associated with at least one of the trailer, a tow vehicle the trailer is configured to mechanically couple to, and an area surrounding at least one of the trailer and the tow vehicle, and a controller, comprising one or more processors, and a memory storing software instructions that, when executed by the one or more processors, cause the one or more processors to: obtain the sensor data from the one or more sensors; obtain an indication of an event based at least in part on the sensor data; and initiate a mechanical coupling or decoupling of the trailer to the tow vehicle based at least in part on obtaining the indication of the event.

In some aspects, the controller can comprise system 200 comprising one or more processors (e.g., processor 210) and memory (e.g., main memory 215, secondary memory 220) storing the software instructions. The one or more sensors can communicate with controller via, for example, I/O interface 235, external medium 245, and/or antenna 270. The controller can be a part of the trailer, and configured to control various components of the trailer.

In some embodiments, obtaining the indication of the event based at least in part on the sensor data comprises identifying the event based at least in part on the sensor data. In some embodiments, obtaining the indication of the event comprises transmitting the sensor data to a computing device having and/or coupled to a memory storing a machine learning model and/or correlation data and/or any other suitable data, and receiving the indication of the event based at least in part on the sensor data and the machine learning model and/or correlation data and/or any other suitable data. Suitable data can comprise, for example, sensor data, event data, historic data, driver data, vehicle data, navigation data, trailer data, traffic data, threshold data, or any other suitable data. Correlation data can comprise correlations between inputs (e.g., car approaching, yellow light, green light, curved road approaching) and outputs (e.g., activating brakes, activating a brake light, turning off a brake light, activating a turn signal, activating a steering system). In some embodiments, correlation data can comprise data associated with the roads, properties, lots, and/or environment the trailer is positioned and/or passing through. In some embodiments, the correlation data can be collected from sensors, user systems, external systems, platforms, etc. unrelated to the trailer being controlled. In some aspects, the correlation data can be associated with numerous trailer control systems, vehicle infotainment systems, vehicle sensors, trailer sensors, mobile devices that have passed through the roads, properties, lots, and/or environment, and/or even different roads, properties, lots, and/or environment. In some aspects, the correlation data can be associated with numerous trailer control systems located anywhere throughout a location, a city, a county, a state, a country, and/or the world, which can be indicative of various events and conditions (e.g., weather conditions, accidents, red light, changing stop light). Such correlation data can comprise, for example, historic accident data, historic trailer fish-tailing data, image, curvature, height, distance or other data associated with an action, length of time of a yellow light, steering data associated with a turn, brake data associated with a turn, deceleration data associated with a turn, acceleration data associated with a turn, speed data associated with a turn, speed data associated with a bump on the road, data associated with a curvature of a bump on the road, time, speed, curvature or other data associated with an activity, data indicative of a correlation between a condition or characteristic of a trailer, a tow vehicle and/or an environment around the trailer, the tow vehicle and/or the environment and an even and/or action needed, and/or any other suitable data.

In some embodiments, the computing device can comprise system 200 comprising one or more processors (e.g., processor 210) and memory (e.g., main memory 215, secondary memory 220) storing the software instructions. The software instructions, when executed by the one or more processors, can cause the one or more processors to transmit a machine learning model and/or correlation data to the controller. In some embodiments, the computing device can be on the tow vehicle (e.g., part of an infotainment system of the tow vehicle), a mobile phone, tablet or computer, or any other suitable computing device. Computing device can communicate with controller directly (e.g., via Bluetooth, WiFi) with or without a network. Controller can receive a machine learning model and/or correlation data from computing device and initiate an action based at least in part on the machine learning model and/or correlation data. In some embodiments, the software instructions, when executed by the one or more processors, further cause the one or more processors to initiate an action related to at least one component of the trailer based at least in part on identifying the event. The action could comprise, for example, activating and/or releasing/deactivating a brake, activating or deactivating a brake light, activating a turn signal, deactivating a turn signal, activating emergency flashing lights, deactivating emergency flashing lights, powering a motor and/or engine of the trailer, steering one or more wheels, accelerating, decelerating, hitching the trailer to the tow vehicle, unhitching the trailer from the tow vehicle, powering on the trailer, powering off the trailer, parking the trailer, propelling the trailer to a destination, moving the trailer, and/or any other suitable action. In some embodiments, the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer. The adjustment can comprise turning on, activating, turning off, deactivating, braking, parking, hitching, unhitching, steering, turning, accelerating, adjusting a height—e.g., of a suspension system, and/or any other suitable adjustment. In some embodiments, the one or more sensors comprises at least one of an image sensor, a video sensor, an accelerometer, a force sensor, a distance sensor, a global positioning system (GPS) sensor, a radar sensor, a light detection and ranging (lidar) sensor, and an ultrasonic sensor. In some embodiments, the event comprises at least one of a turn, a braking, an acceleration, a deceleration, a stop, a predicted change to a stop light, arrival at a destination, a step in a navigation, an accident, and an obstacle. In some embodiments, the controller comprises a communication interface, and wherein the software instructions, when executed by the one or more processors, cause the one or more processors to transmit to a computing device, via the communication interface, at least one of sensor data and a notification associated with the event, and receive an input from the computing device, wherein initiating the action is further based at least in part on the input. The computing device can comprise system 200 and the input can be received by the computing device via any suitable interface (e.g., I/O interface 235). Any suitable computing device(s) are contemplated including a mobile device, infotainment system of the tow vehicle, and/or a remote computing device. The computing device can communicate with controller with or without a network (e.g., via antenna, RF). In some embodiments, controller can receive an ML model from computing device and initiate an action based at least in part on the ML model. In some embodiments, the controller can transmit data to a computing device for training an ML model. In some embodiments, a computing device has a memory storing an ML model and/or correlation data. In some embodiments, the controller can receive an ML model and/or correlation data from the computing device. In some embodiments, the one or more sensors comprises at least one of an image sensor, a video sensor, an accelerometer, a force sensor, a distance sensor, a global positioning system (GPS) sensor, a radar sensor, a light detection and ranging (lidar) sensor, and an ultrasonic sensor. In some embodiments, the event comprises at least one of a turn, a braking, an acceleration, a deceleration, a stop, a predicted change to a stop light, arrival at a destination, a step in a navigation, an accident, and an obstacle.

As an example, controller (which can comprise a system 200) can be directly coupled to a computing device (which can comprise a second system 200) via Bluetooth, WiFi, antenna, etc. In an embodiment, the one or more processors can obtain sensor data indicative of the tow vehicle parking in a destination (e.g., image data, video data, GPS data, audio data), obtain an indication that the tow vehicle is ready for the trailer to de-couple from the tow vehicle (e.g., mechanically unhitch), and initiate a de-coupling/unhitching of the trailer from the tow vehicle and/or other action based at least in part on obtaining the indication. Obtaining the indication can comprise identifying the tow vehicle is headed for a parking destination, and/or transmitting the sensor data to a computing device and receiving the indication (e.g., after the computing device queries one or more databases storing correlation data and/or any other suitable data). For example, the correlation data could comprise a correlation between image/video data of a tow vehicle turning towards and/or stopped near (e.g., with a turn signal on) a parking space that is under a threshold size relative to the tow vehicle, and a need to unhitch the trailer from the tow vehicle. Initiating the de-coupling unhitching can comprise unlocking a coupling device from a trailer hitch, for example, by causing retractable pins of a locking mechanism of the coupling device to retract such that the coupling device, while remaining on the trailer, is no longer secured to the trailer hitch. In some embodiments, sensor data can comprise image/video/light data of an open second destination, an indication that be indicative of an open parking space sized and dimensioned to fit the trailer, and initiating an action can comprise activation of a propulsion, steering, navigation and/or other system of the trailer, for example, to cause the trailer to navigate and park in the open second destination (e.g., after unhitching). In some embodiments, sensor data can comprise data associated with a height of a tow vehicle and data associated with a height of a trailer, the sensor data and/or a notification associated with the sensor data (e.g., that the tow vehicle hitch is higher off the ground than a coupling device of the trailer) can be sent to computing device, and the computing device can present a user with the sensor data/notification via a user interface (e.g., a sound, text and/or images on a display), receive an input (e.g., a user input, for example, from a driver of the tow vehicle) via the user interface, and transmit instructions to the controller to adjust a height of a suspension system and/or component of the trailer.

As another example, the controller can comprise external system 140, which can be communicatively coupled to platform 110 (e.g., a company's web server), and/or user system 130 via a network. Computing device can comprise the user system 130 (e.g., infotainment system of tow vehicle, mobile phone, any other computing device). Each of external system 140, platform 110, and user system 130 can comprise system 200. An application can be in main memory 215. Processor 210 can be configured to run the software/execute the application. Secondary memory 220 can comprise a local and/or remote database. In some embodiments, a user of a user system 130 can access platform 110 (e.g., via a login after creating an account), and communicate instructions, commands, data and/or other inputs, for example, related to a trailer, a tow vehicle, and/or an environment around the trailer/tow vehicle. The platform can communicate with external system 140 (e.g., a controller onboard the trailer) and cause an action on the trailer (e.g., a hitching, unhitching, parking, navigating from a parking spot to the tow vehicle), for example, based on inputs from user system 130. In some embodiments, one or more user systems 130 and/or external systems 140 can transmit inputs and/or outputs to platform 110. Platform 110 can comprise or be communicatively coupled with one or more databases that can store the inputs and/or outputs and/or correlations between the inputs and outputs.

In some embodiments, a trailer does not require full autonomy, and is controlled in part based on input from a driver/passenger of a tow vehicle that the trailer is physically tethered to, for example, input of the driver/passenger via an interface coupled to and/or presented by infotainment system of the tow vehicle and/or a mobile phone.

According to another aspect, a trailer configured to couple (e.g., mechanically) to a tow vehicle is provided, comprising a braking system, powering system, a steering system, a hitching system, and a controller operably coupled to at least one of the braking system, powering system, the steering system and the hitching system for at least one of unhitching, hitching and parking the trailer. Viewed from another perspective, the trailer can be configured to sense its environment and accelerate, propel, decelerate, turn, turn on lights (e.g., brake lights, turn signals), park, hitch to a trailer, unhitch from a trailer, etc. with no or reduced human interaction. Viewed from another perspective, the trailer can be configured to perform all parking, hitching, and unhitching functions without a driver or passenger. The braking system can comprise any components useful to decelerate the trailer. The powering (or propulsion/propelling) system can comprise any components useful for powered motion of the trailer, for example, a motor and/or engine, an energy source (e.g., fuel, battery, gasoline, diesel, propane, solar panels, electrical power sources, and/or any other suitable energy sources) to power the engine/motor, a transmission (e.g., elements operable to transmit mechanical power from the engine and/or motor to the wheels, gearbox, clutch, differential, and/or drive shaft), and/or wheels. The steering system can comprise any components useful to steer the trailer (e.g., steerable wheels, steering unit comprising any components operable to adjust the heading of the trailer). The hitching system can comprise any components useful to hitch the trailer to a vehicle, including, for example, an actuator coupled to an engagement and/or locking mechanism that engages/locks a trailer coupling device to a tow vehicle hitch, and/or a height adjustable suspension system that is configured to raise/lower the trailer or portion thereof to align the coupling device to the hitch. The trailer may also comprise a sensing system comprising one or more sensors (e.g., image sensors, accelerometers, height sensors, brake sensor, steering sensor) as described herein. The trailer may also comprise a lighting system comprising one or more lights and switches/components for causing a light to turn on, off, flash, etc.

In some embodiments, a trailer can comprise any suitable components such that the trailer can park, mechanically hitch to a tow vehicle and/or mechanically unhitch from a tow vehicle via a controller operably connected to such components. Some contemplated trailers can comprise components of cars and trucks, for example, components described in U.S. Pat. No. 11,203,337, which is incorporated by reference in its entirety.

In some embodiments, the controller comprises at least one hardware processor, a communication interface, and one or more software modules that are configured to, when executed by the at least one hardware processor, cause the one or more processors to receive an input from a computing device. In some embodiments, the one or more software modules, when executed by the at least one processor, cause the one or more processors to initiate an action related to at least one of the powering system, the steering system and the hitching system of the trailer based at least in part on the input. In some embodiments, the trailer further comprises a sensing system comprising one or more sensors. In some embodiments, the controller can be configured to communicate with a computing device (e.g., a mobile device of a driver of the tow vehicle, an infotainment system of the tow vehicle), which can allow a driver and/or passenger of the tow vehicle to interact with the controller from within the tow vehicle.

In some embodiments, the controller comprises at least one hardware processor, a communication interface, and one or more software modules that are configured to, when executed by the at least one hardware processor, cause the one or more processors to obtain sensor data from at least one sensor of the sensing system, and initiate an action related to at least one of the powering system, the steering system and the hitching system of the trailer based at least in part on the sensor data. In some embodiments, the software modules are further configured to, when executed by the at least one hardware processor, cause the one or more processors to receive an input from a computing device, and wherein initiating the action is based at least in part on the input. In some embodiments, at least one sensor of the sensing system comprises at least one of an image sensor, a video sensor, an accelerometer, a force sensor, a distance sensor, a global positioning system (GPS) sensor, a radar sensor, a light detection and ranging (lidar) sensor, and an ultrasonic sensor. In some embodiments, the software modules are further configured to, when executed by the at least one hardware processor, identify an event based at least in part on the sensor data, and wherein initiating the action is based at least in part on identifying the event.

Another key element for self-hitching/self-unhitching is the ability to safely connect to the hitch of a tow vehicle. Traditionally this has been done with a ball type hitch that has not been improved in decades. The traditional coupling includes a trailer hitch, a receiver tube coupled to the trailer hitch, a ball mount extending at an angle between receiver tube and trailer ball, a trailer ball, a trailer coupler that attaches to trailer ball, safety chains, a hatch pin, and trailer wiring harness. A coupling device is provided herein that eliminates the trailer coupler, the trailer ball, the ball mount (also called a receiver or receiver hitch), the hitch pin, the safety chains, and the wiring harness and replaces them with one or more joints (e.g., articulating joint) on the trailer that connects directly into the receive tube and then sets its own pins when fully inserted to lock it into place. This can be visually verified, for example, from the cabin of the tow vehicle using the backup camera of the tow vehicle, or the hitch camera of the trailer displayed on either the vehicle's infotainment screen or on a mobile device screen using the trailer's app. In some embodiments, the coupling device eliminates the receiver and ball and instead interfaces directly with the hitch (e.g., via receiver) through an articulating joint that allows for roll and pitch but isolates yaw.

This can reduce the forces being transferred from the tow vehicle to the trailer and from the trailer to the tow vehicle due to road irregularities, impacts, or roll overs. The joints contemplated herein can comprise any suitable joint, including for example, a large commercial vehicle driveline U-joint (e.g., Meritor Permalube™ RPL Heavy-Duty Driveline Series—see https://www.meritor.com/products/drivelines/rpl/).

In an aspect, a trailer configured to couple to a tow vehicle having a hitch with first and second openings is provided, comprising a coupling device, comprising: a first portion coupled to the trailer, a second portion coupled to the first portion via a first joint, a third portion coupled to the second portion via a second joint, and wherein the third portion comprises an end portion sized and dimensioned to be received directly by the hitch of the tow vehicle, the end portion comprising first and second pins configured to extend through the first and second openings to secure the coupling device to the tow truck. In some embodiments, the first and second pins can be retractable (e.g., spring loaded, retracted/extended via an actuator. In some embodiments, the first and second joints each provide pitch, and only the second joint provides roll. In some embodiments, the first and second joints can each comprise U joints.

Figure 3:
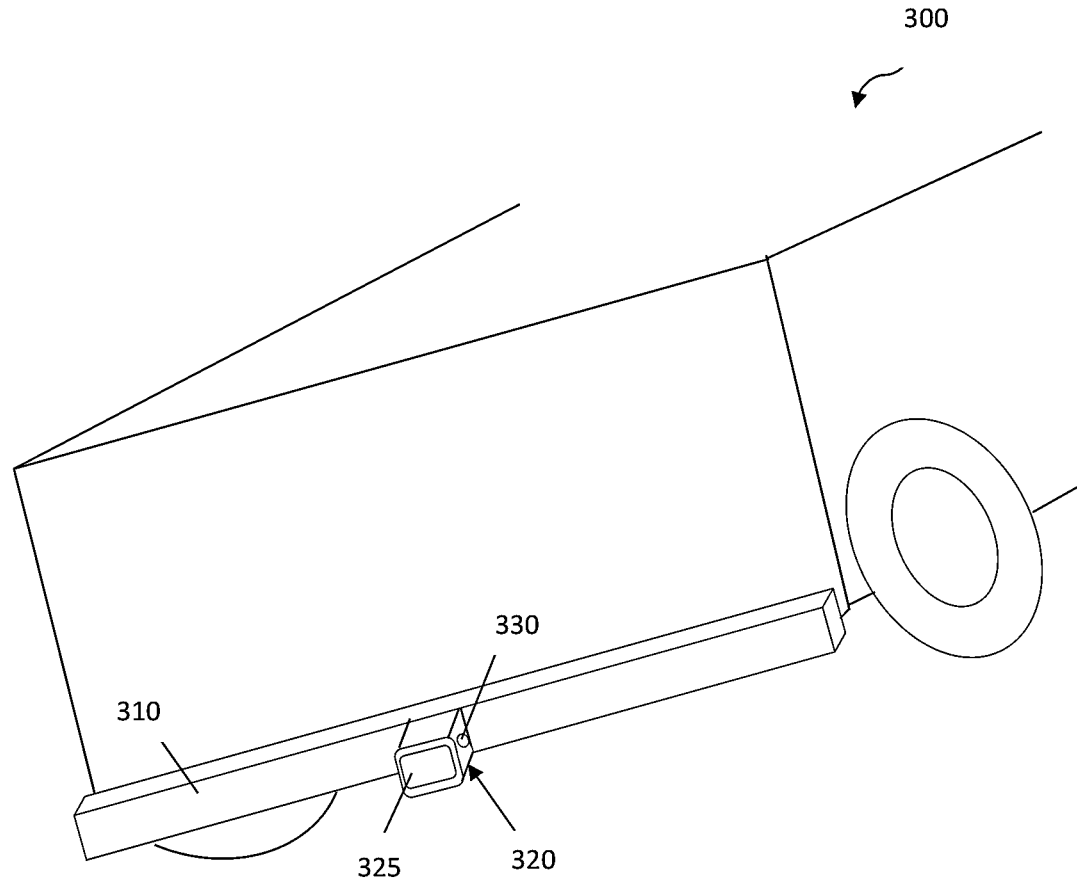
FIG. 3 illustrates a tow hitch, according to an embodiment.
Figure 4:
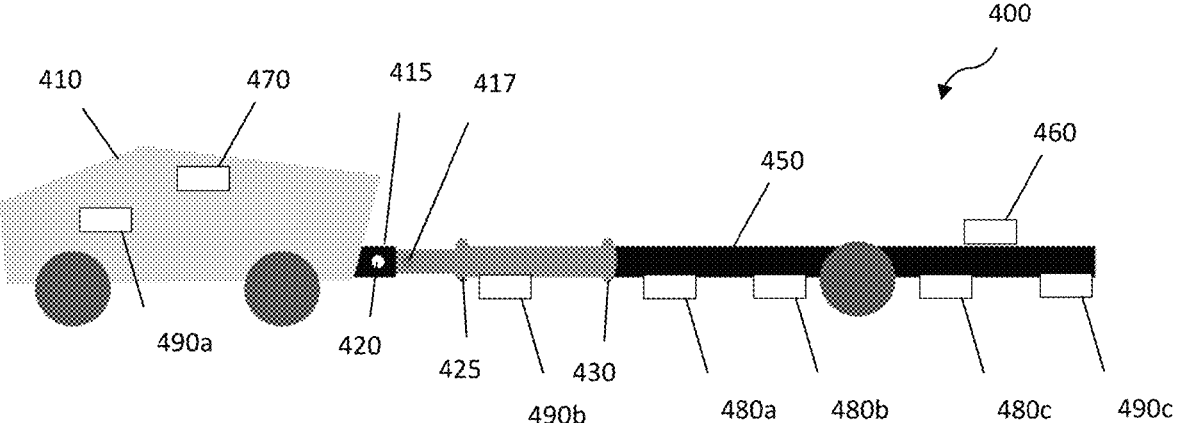
FIG. 4 illustrates a system for controlling a trailer, and a coupling device, according to an embodiment.

FIG. 3 illustrates a tow vehicle 300 comprising a hitch 320 coupled to a bumper 310. Hitch 320 comprises a receiver 325 and one or more openings 330 sized and dimensioned to receive one or more pins of a coupling device. FIG. 4 illustrates a system 400 comprising a tow vehicle 410 comprising a hitch 415, a trailer 450 having a controller 460 operatively coupled to one or more of a braking system 480*a*, a powering system 480*b*, a steering system 480*c*, a hitching system, a parking system, a navigation system and/or any other suitable system(s) for powered motion, steering, braking, accelerating, decelerating, hitching and/or unhitching of trailer. Trailer can comprise and/or be coupled to a coupling device, which can include joints (e.g., first joint 430, second joint 425) as described above. In some embodiments, controller 460 can communicate with computing device 470, which can comprise, for example, a mobile device of a driver or passenger of tow vehicle 410, an infotainment system of the tow vehicle, and/or any other suitable computing device.

Hitch 415 can be similar to hitch 320, and include a receiver and one or more openings (e.g., opening 420) sized and dimensioned to receive one or more pins 417 of the coupling device.

In some embodiments, some or all of the one or more sensors (e.g., 490*a*, 490*b*, 490*c*) can be coupled to and/or positioned on at least one of the trailer, the tow vehicle and the coupling device.

In another aspect, a system for controlling a trailer is provided, comprising one or more sensors configured to detect data associated with at least one of the trailer, a tow vehicle the trailer is configured to mechanically couple to, and an area surrounding at least one of the trailer and the tow vehicle, and a controller, comprising: one or more processors; and a memory storing software instructions that, when executed by the one or more processors, cause the one or more processors to: obtain the sensor data from the one or more sensors, identify an event associated with at least one of the trailer, the tow vehicle and the area surrounding at least one of the trailer and the tow vehicle based at least in part on the sensor data, and initiate an action related to at least one component of the trailer based at least in part on identifying the event. The one or more sensors can comprise any suitable number of sensors (e.g., 1-100, 1-50, 1-25, at least 1, at least 5, at least 10, at least 15, at least 20). The one or more sensors can be positioned anywhere, including for example, coupled to and/or onboard the trailer (e.g., on or adjacent a light, a bumper, a suspension system, a frame, an upper, a wheel, an axle, a front portion, a side portion, and/or a rear portion), the tow vehicle (e.g., on or adjacent a hood, a door, a steering wheel, a brake system component, a steering system component, a window, a trunk, a tire, a suspension system, a chassis, a mirror), and/or the coupling device. The action could comprise, for example, activating and/or releasing/deactivating a brake, activating or deactivating a brake light, activating a turn signal, deactivating a turn signal, activating emergency flashing lights, deactivating emergency flashing lights, powering a motor and/or engine of the trailer, steering one or more wheels, accelerating, decelerating, hitching the trailer to the tow vehicle, unhitching the trailer from the tow vehicle, powering on the trailer, powering off the trailer, parking the trailer, propelling the trailer to a destination, moving the trailer, and/or any other suitable action. In some embodiments, the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer. The adjustment can comprise turning on, activating, turning off, deactivating, braking, parking, hitching, unhitching, steering, turning, accelerating, adjusting a height—e.g., of a suspension system, and/or any other suitable adjustment. In some embodiments, the controller comprises system 200. In some embodiments, the controller comprises a communication interface, and wherein the software instructions, when executed by the one or more processors, cause the one or more processors to transmit to a computing device, via the communication interface, at least one of sensor data and a notification associated with the event, and receive an input from the computing device, wherein initiating the action is further based at least in part on the input. In some embodiments, the computer system comprises system 200. In some embodiments, the input can comprise, for example, a selection of a parking space or location, a command to take an action (e.g., any of the aforementioned actions), and/or any other suitable input(s). In some embodiments, the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer. In some embodiments, the one or more sensors comprises at least one of an image sensor, a video sensor, an accelerometer, a force sensor, a distance sensor, a global positioning system (GPS) sensor, a radar sensor, a light detection and ranging (lidar) sensor, and an ultrasonic sensor. In some embodiments, the event comprises at least one of a turn, a braking, an acceleration, a deceleration, a stop, a predicted change to a stop light, arrival at a destination, a step in a navigation, an accident, and an obstacle.

In another aspect, a non-transitory computer readable medium having instructions stored therein is provided, wherein the instructions, when executed by a processor, cause the processor to: obtain the sensor data from one or more sensors coupled to at least one of a tow vehicle and a trailer configured to couple to the tow vehicle, obtain an indication of an event associated with at least one of the trailer, the tow vehicle and the area surrounding at least one of the trailer and the tow vehicle based at least in part on the sensor data, and initiate an action related to at least one component of the trailer based at least in part on identifying the event. In some embodiments, obtaining the indication of the event based at least in part on the sensor data comprises identifying the event based at least in part on the sensor data. In some embodiments, obtaining the indication of the event comprises transmitting the sensor data to a computing device having a memory storing a machine learning model, and receiving the indication of the event based at least in part on the sensor data and the machine learning model. In some embodiments, the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer. In some embodiments, the action comprises hitching the trailer to the tow vehicle. In some embodiments, the action comprises unhitching the trailer from the tow vehicle.

In another aspect, a method is provided, comprising using at least one hardware processor to obtain sensor data from one or more sensors coupled to at least one of a tow vehicle and a trailer configured to couple to the tow vehicle, obtain an indication of an event associated with at least one of the trailer, the tow vehicle and the area surrounding at least one of the trailer and the tow vehicle based at least in part on the sensor data, and initiate an action related to at least one component of the trailer based at least in part on identifying the event. In some embodiments, obtaining the indication of the event based at least in part on the sensor data comprises identifying the event based at least in part on the sensor data. In some embodiments, obtaining the indication of the event comprises transmitting the sensor data to a computing device having a memory storing a machine learning model, and receiving the indication of the event based at least in part on the sensor data and the machine learning model. In some embodiments, the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer. In some embodiments, the action comprises hitching the trailer to the tow vehicle. In some embodiments, the action comprises unhitching the trailer from the tow vehicle.

In some embodiments, adjustments to the marker lights, signal lights, brake lights and emergency flashers of a trailer can all be accomplished using the optical sensors (cameras) and processor (e.g., AI processor) to mimic what the tow vehicle the trailer is mechanically coupled to is doing. However, since drivers don't always properly use, for example, turn signals, the trailer can also (e.g., via sensors and the controllers described herein) automatically engage the turn signals when it notices the tow vehicle initiating a turn or lane change regardless of whether the driver engages the tow vehicles' turn signal (or, indicator) lights.

The lights of the trailer and/or braking system can also be engaged for braking based on the tow vehicle's brake light activation or due to the accelerometer(s) coupled to the trailer sensing a decelerating force of a certain magnitude that is greater than the force of coasting.

In some aspects, a system is provided comprising at least one sensor configured to obtain sensor data associated with at least one of a trailer, a tow vehicle, and an area surrounding at least one of the trailer and the tow vehicle. The system can further comprise a processing system coupled with the at least one sensor and configured to communicate the sensor data, and a platform. The platform can comprise and/or access a database storing correlation data, an ML model, etc. The platform can further comprise an application coupled with the database and configured to receive the sensor data (e.g., from the processing system) and determine an event associated with at least one of the trailer, the tow vehicle and the area surrounding at least one of the trailer and the two vehicle based at least in part on the sensor data. In some aspects, the application can determine the event based at least in part on a query of a database storing correlation data, threshold data and/or any other suitable data. In some aspects, the application is further configured to at least one of transmit instructions to initiate/cause the trailer to take a first action based at least in part on determining the event.

The sensor data described herein can comprise any suitable data associated with the vehicle, trailer, and/or a surrounding. For example, sensor data can comprise, among other things, speed data, image data, video data, sound data, crowd data, data associated with an intersection, data associated with an intersection light, data associated with a movement of the vehicle, data associated with a tilt, data associated with a turn, data associated with a height, data associated with a parking space, charging space and/or other location, and/or data associated with a distance to another vehicle or object.

In some aspects, the platform can comprise system 200. In some aspects, the platform can further be configured to communicate with one or more systems, for example one or more user systems 130 and/or external systems 140. The user system can comprise, for example, an infotainment system of a tow vehicle and/or a mobile device of a driver/passenger of the tow vehicle. The external system can comprise, for example, a controller onboard the trailer.

In some aspects, an event can comprise a turn, a stop sign or red light, a change from a red light to a green light, or a green light to a red light, a direction, entering a parking lot, a step in a navigation route (e.g., turn, enter or exit a freeway), an accident, a stopped car, or any other suitable event.

The action can be any suitable action of the trailer, including for example, setting off an alarm, turning off an alarm, turning a turn signal on or off, applying or releasing a brake or brake light, accelerating a trailer, decelerating a trailer, steering a trailer, and/or collapsing and/or expanding a trailer (e.g., a collapsible trailer as described in U.S. patent application Ser. No. 17/714,948).

In some aspects, a system for trailer control is provided, comprising a user interface configured to receive an input associated with a destination (e.g., a trailer destination, a tow vehicle destination, a destination of a driver or user). The system can also include a controller, comprising one or more processors, and a memory storing software instructions that, when executed by the one or more processors, cause the one or more processors to cause a trailer to at least one of unhitch from the tow vehicle, hitch to the tow vehicle, and navigate to a destination. The user interface can be, for example, a part of the tow vehicle, the trailer, or a remote user system. In some aspects, at least one sensor is provided and configured to obtain sensor data associated with at least one of the trailer, the tow vehicle, the destination, and an area surrounding at least one of the trailer, the tow vehicle, and the destination. In some aspects, the software instructions, when executed by the one or more processors, further cause the one or more processors to obtain sensor data from the at least one sensor. In some aspects, one or more databases are provided, and the software instructions when executed by the one or more processors, further cause the one or more processors to obtain navigation data (e.g., navigation instructions, map data, distance data, traffic information) associated with the destination from the one or more databases.

In some aspects, the controller is configured to determine a suitable destination (e.g., parking space) based at least in part on the sensor data. In some aspects, the controller is configured to determine a suitable destination (e.g., parking space) based at least in part on the sensor data and a query of a database storing, for example, sensor data, event data, historic data, driver data, vehicle data, navigation data, trailer data, traffic data, threshold data, correlation data, and/or any other suitable data.

Thus, specific examples of self-hitching and parking trailers, and systems, methods, and non-transitory computer-readable media for controlling a trailer have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The illustrations may include exaggerated dimensions and graphical representation to better illustrate the referenced items shown, and are not considered limiting unless expressly stated as such.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only"

and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Groupings of alternative elements or embodiments of the disclosure herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for controlling a trailer, comprising:
one or more sensors configured to detect data associated with at least one of the trailer, a tow vehicle the trailer is configured to mechanically couple to, and an area surrounding at least one of the trailer and the tow vehicle; and
a controller, comprising:
one or more processors; and
a memory storing software instructions that, when executed by the one or more processors, cause the one or more processors to:
obtain the sensor data from the one or more sensors;
obtain an indication of an event based at least in part on the sensor data; and
initiate a mechanical coupling and decoupling of the trailer to the tow vehicle, as well as autonomously parking the trailer, based at least in part on obtaining the indication of the event.

2. The system of claim 1, wherein obtaining the indication of the event based at least in part on the sensor data comprises identifying the event based at least in part on the sensor data.

3. The system of claim 1, wherein obtaining the indication of the event comprises transmitting the sensor data to a computing device having a memory storing a machine learning model, and receiving the indication of the event based at least in part on the sensor data and the machine learning model.

4. The system of claim 1, wherein the software instructions, when executed by the one or more processors, further cause the one or more processors to initiate an action related to at least one component of the trailer based at least in part on identifying the event.

5. The system of claim 4, wherein the action comprises at least one of an adjustment to a power system of the trailer, adjustment to a braking system of the trailer, adjustment to a steering system of the trailer, adjustment to a lighting system of the trailer, adjustment to a propulsion system of the trailer, an adjustment to a suspension system of the trailer, and an adjustment to a hitching system of the trailer.

6. The system of claim 1, wherein the one or more sensors comprises at least one of an image sensor, a video sensor, an accelerometer, a force sensor, a distance sensor, a global positioning system (GPS) sensor, a radar sensor, a light detection and ranging (lidar) sensor, and an ultrasonic sensor.

7. The system of claim 6, wherein the controller comprises a communication interface, and wherein the software instructions, when executed by the one or more processors, cause the one or more processors to transmit to a computing device, via the communication interface, at least one of sensor data and a notification associated with the event, and receive an input from the computing device, wherein initiating the action is further based at least in part on the input.

8. The system of claim 1, wherein the event comprises at least one of a turn, a braking, an acceleration, a deceleration, a stop, a predicted change to a stop light, arrival at a destination, a step in a navigation, an accident, and an obstacle.

9. A trailer configured to mechanically couple to a tow vehicle, comprising:

one or more sensors configured to detect data associated with at least one of the trailer, a tow vehicle the trailer is configured to mechanically couple to, and an area surrounding at least one of the trailer and the tow vehicle;

a powering system;

a steering system;

a hitching system; and a controller operably coupled to the powering system, the steering system and the hitching system the controller, comprising:

one or more processors; and a memory storing software instructions that, when executed by the one or more processors, cause the one or more processors to:

obtain the sensor data from the one or more sensors;

obtain an indication of an event based at least in part on the sensor data; and initiate a mechanical coupling and decoupling of the trailer to the tow vehicle, as well as autonomously parking the trailer, based at least in part on obtaining the indication of the event.

10. The trailer of claim 9, wherein the controller comprises:

a communication interface; and wherein the one or more software modules are further configured to, when executed by the at least one hardware processor, cause the one or more software modules to receive an input from a computing device.

11. The trailer of claim 10, wherein the one or more software modules, when executed by the at least one hardware processor, are further configured to cause the at least one processor to initiate an action related to at least one of the powering system, the steering system and the hitching system of the trailer based at least in part on the input.

12. The trailer of claim 10, further comprising a sensing system comprising the one or more sensors.

13. The trailer of claim 12, wherein the one or more software modules are further configured to, when executed by the at least one hardware processor, cause the one or more software modules to obtain sensor data from at least one sensor of the sensing system, and initiate an action related to at least one of the powering system, the steering system and the hitching system of the trailer based at least in part on the sensor data.

14. The trailer of claim 13, wherein the one or more software modules are further configured to, when executed by the at least one hardware processor, cause the one or more software modules to initiate the action is based at least in part on the input.

15. The trailer of claim 12, wherein the sensing system comprises at least one of an image sensor, a video sensor, an accelerometer, a force sensor, a distance sensor, a global positioning system (GPS) sensor, a radar sensor, a light detection and ranging (lidar) sensor, and an ultrasonic sensor.

16. The trailer of claim 13, wherein the one or more software modules are further configured to, when executed by the at least one hardware processor, identify an event based at least in part on the sensor data, and wherein initiating the action is based at least in part on identifying the event.

17. The trailer of claim 9, further comprising a braking system.

* * * * *